US007212675B2

(12) United States Patent
Myers

(10) Patent No.: US 7,212,675 B2
(45) Date of Patent: May 1, 2007

(54) METHOD OF FINDING ORPHAN BLOCKS IN BLOCK BASED IMAGE COMPRESSION SCHEMES

(75) Inventor: James C. Myers, Florissant, MO (US)

(73) Assignee: Comtrak Technologies, L.L.C., Hazelwood, MO (US)

( * ) Notice: Subject to any disclaimer, the term of this patent is extended or adjusted under 35 U.S.C. 154(b) by 747 days.

(21) Appl. No.: 10/341,986

(22) Filed: Jan. 14, 2003

(65) Prior Publication Data

US 2004/0136594 A1 Jul. 15, 2004

(51) Int. Cl.
*G06K 9/36* (2006.01)

(52) U.S. Cl. ........................ 382/232; 382/269; 382/199

(58) Field of Classification Search ................ 382/232, 382/269, 199; 348/606, 607; 705/415, 416
See application file for complete search history.

(56) References Cited

U.S. PATENT DOCUMENTS 5,121,205 A 6/1992 Ng et al.
5,852,475 A * 12/1998 Gupta et al. ................ 348/606
5,920,356 A * 7/1999 Gupta et al. ................ 348/606

OTHER PUBLICATIONS

Malvar, "Fast Progressive Wavelet Coding", IEEE, Data Compression Conference, 3-1999, pp. 336-343.*

* cited by examiner

*Primary Examiner*—Anh Hong Do
(74) *Attorney, Agent, or Firm*—Polster, Lieder, Woodruff & Lucchesi, L.C.

(57) ABSTRACT

A method of processing the contents of an image which are digitized and formatted into macro blocks (MB) of information. The method involves flagging for further use those macro blocks whose contents satisfy a first criteria. Further processing of the method is performed only using the status of each macro block, either flagged or unflagged, and ignoring the contents. Unflagged blocks adjacent flagged blocks are investigated using a testing protocol and using a second criteria to determine if they should also be flagged. The status of an unflagged block meeting the second criteria is changed from unflagged ("O") to flagged ("1"). The method converts unflagged orphan macro blocks which should have been identified using the first criteria into flagged macro blocks. These are combined with the original set of flagged macro blocks to determine the entire set of macro blocks whose contents are to be used in subsequent processing.

28 Claims, 5 Drawing Sheets

MB2 MB3

| | | | | | | | | | | | | | | |
|---|---|---|---|---|---|---|---|---|---|---|---|---|---|---|
| 0 | 1 | 0 | 1 | 0 | 0 | 0 | 0 | 0 | 0 | 0 | 0 | 0 | 1 | 0 |
| 0 | 0 | 0 | 0 | 1 | 1 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 |
| 0 | 0 | 0 | 0 | 0 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

| | | | | | | | | | | | | | | |
|---|---|---|---|---|---|---|---|---|---|---|---|---|---|---|
| 1 | 1 | 2 | 1 | 1 | 0 | 0 | 0 | 0 | 0 | 0 | 0 | 1 | 1 | 1 |
| 0 | 0 | 0 | 1 | 2 | 2 | 1 | 0 | 0 | 0 | 0 | 0 | 1 | 1 | 1 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 1 | 2 | 2 | 1 | 0 | 0 | 0 | 0 | 0 | 0 | 0 |
| 0 | 0 | 0 | 0 | 1 | 1 | 1 | 0 | 0 | 0 | 0 | 0 | 0 | 0 | 0 |
| 0 | 0 | 0 | 0 | 1 | 1 | 1 | 0 | 0 | 0 | 0 | 0 | 0 | 0 | 0 |
| 0 | 0 | 0 | 0 | 1 | 2 | 3 | 2 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG. 2

| | | | | | | | | | | | | | | |
|---|---|---|---|---|---|---|---|---|---|---|---|---|---|---|
| 1 | 1 | 2 | 2 | 3 | 2 | 1 | 0 | 0 | 0 | 0 | 0 | 2 | 2 | 2 |
| 1 | 1 | 2 | 2 | 3 | 2 | 1 | 0 | 0 | 0 | 0 | 0 | 2 | 2 | 2 |
| 0 | 0 | 0 | 1 | 2 | 2 | 1 | 0 | 0 | 0 | 0 | 0 | 1 | 1 | 1 |
| 0 | 0 | 0 | 0 | 1 | 2 | 2 | 1 | 0 | 0 | 0 | 0 | 0 | 0 | 0 |
| 0 | 0 | 0 | 0 | 2 | 3 | 3 | 1 | 0 | 0 | 0 | 0 | 0 | 0 | 0 |
| 0 | 0 | 0 | 0 | 3 | 4 | 4 | 1 | 0 | 0 | 0 | 0 | 0 | 0 | 0 |
| 0 | 0 | 0 | 0 | 3 | 4 | 5 | 2 | 1 | 0 | 0 | 0 | 0 | 0 | 0 |
| 0 | 0 | 0 | 0 | 2 | 3 | 4 | 2 | 1 | 0 | 0 | 0 | 0 | 0 | 0 |
| 0 | 0 | 0 | 0 | 1 | 2 | 3 | 2 | 1 | 0 | 0 | 0 | 0 | 0 | 0 |

FIG. 3

| | | | | | | | | | | | | | | |
|---|---|---|---|---|---|---|---|---|---|---|---|---|---|---|
| 0 | 1 | 0 | 1 | 1 | 0 | 0 | 0 | 0 | 0 | 0 | 0 | 0 | 1 | 1 |
| 0 | 0 | 0 | 0 | 1 | 1 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 |
| 0 | 0 | 0 | 0 | 0 | 1 | 1 | 1 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 |

FIG. 4 visually monitoring a scene and capturing an image of the scene; generating the digital image that is representative of the image of the scene; transmitting the digital image that is representative of the scene to the processor 10

↓ formatting the digital contents of the image into macro blocks MB1, MB2, MB3 of digital information

↓ processing each macro block MB1 using a predetermined processing criteria of the processor to distinguish significant macro blocks MB1 from macro blocks MB1 not deemed significant, macro blocks MB1 identified as being significant being referred to as flagged, and those macro blocks MB1 identified as not deemed significant being referred to as unflagged;

↓ comparing unflagged macro blocks MB1 to surrounding macro blocks MB1

↓ changing the status of an unflagged macro block MB1 to flagged if an assigned value of the compared macro blocks MB1 surrounding the unflagged macro block MB1 exceeds a predetermined threshold wherein the initially flagged macro blocks MB1 and the newly flagged macro blocks MB1 are compared to a stored reference image of the scene so that the processor determines whether to store the newly flagged macro blocks MB1

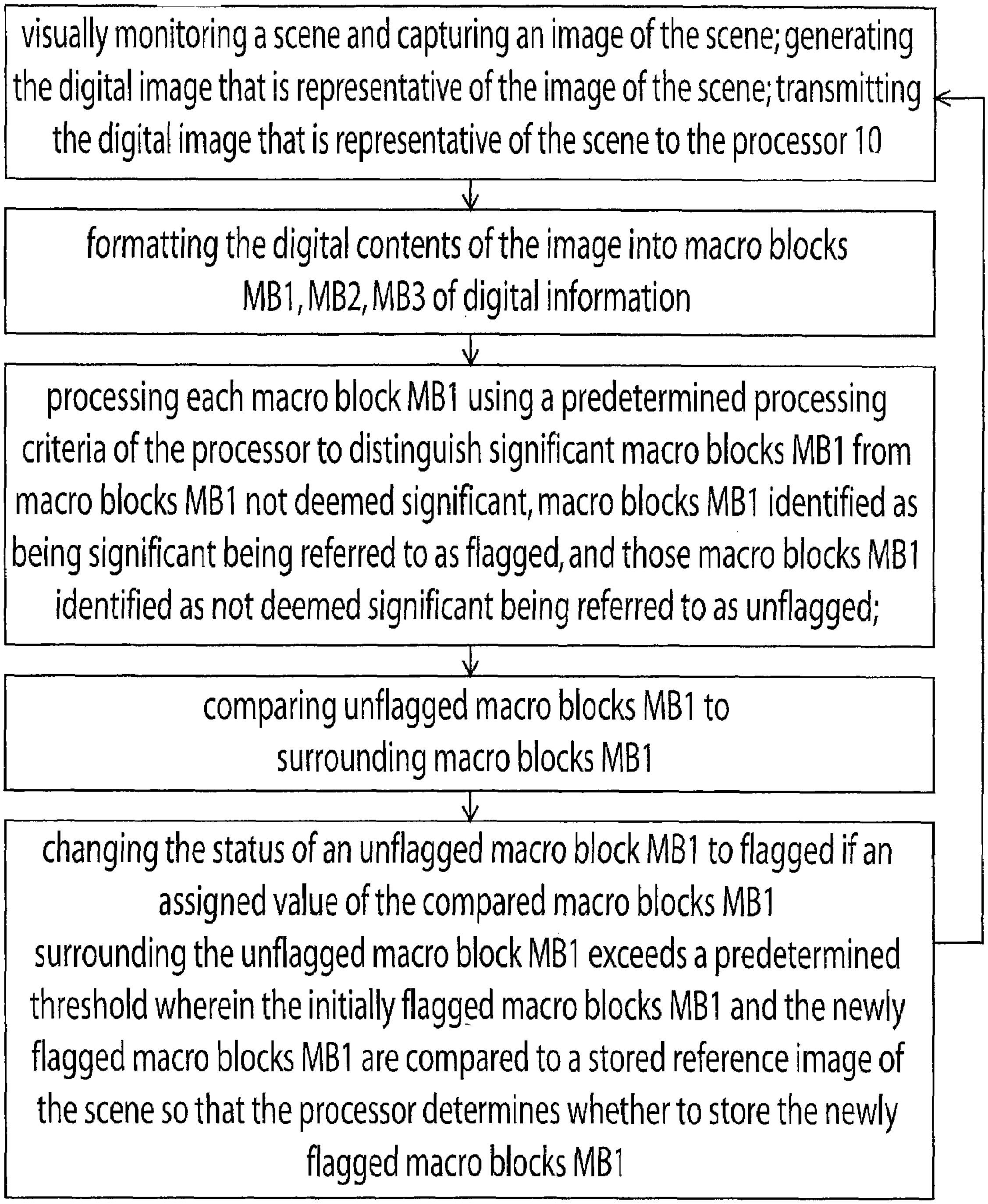

FIG. 9

METHOD OF FINDING ORPHAN BLOCKS IN BLOCK BASED IMAGE COMPRESSION SCHEMES

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention is directed to attaining higher data compression ratios in block based image compression schemes; and in particular, to attaining such ratios without reliance on color differences, and with little or no increase in data processing time.

In current video processing schemes, for example, a frame representing an image of video is compared against a reference frame. If the frame is essentially identical to the reference frame (i.e., the image obtained at a later point in time is essentially identical to the image obtained at an earlier point in time and represented by the reference frame), the information contained in the later acquired frame is discarded. Processing schemes incorporate a set of criteria (e.g., intensity threshold) by which the one frame is compared against the other, and only if the criteria are met, is information from the later acquired frame retained.

Further, even if the later acquired frame does meet the retention criteria, it is not necessarily desirable to retain all of the information contained in the frame. Rather, given system processing constraints and memory capabilities, it is usually desirable to only retain that portion of the frame containing information differing from that in the reference frame. The frames are typically divided into blocks of data and as part of the processing; various of the blocks are identified as those whose contents are to be saved. These blocks are referred to as macro blocks and if they are to be saved, they are "flagged" as part of the image processing. It often occurs that within an area of the image where blocks have been flagged, there are other macro blocks where the criteria threshold has not been met, even though the "unflagged" block represents a changed portion of the image. These blocks are referred to as "orphan" blocks. The problem with orphan blocks is that if the video imagery represented therein is not saved, holes or gaps will appear in the saved image when the stored information is subsequently recalled and displayed.

Orphan blocks are not particularly noticeable in black and white (B&W) images because the intensities of the blocks comprising the reference frame are very close to those in the frame being compared. In color images, the failure to save orphan blocks is very noticeable, particularly where the colors are different, but the intensities are still relatively close. A typical result of this type situation would be where a portion of a background in front of which a person is standing appears in the middle of the image of a person's face. A potential solution to this problem would be to investigate color within the image. However, to do so requires examining every pixel within the macro block and this would require substantial additional processing time. The present invention employs a process involving intensity comparisons and identifying as orphaned macro blocks those surrounded by flagged macro blocks.

BRIEF SUMMARY OF THE INVENTION

Briefly stated, the method of the present invention is directed to a method of processing the contents of an image. The contents are digitized and formatted into macro blocks of information. The method involves identifying an orphan block within a cluster of macro blocks a substantial number of which have satisfied a criteria by which the contents thereof have been identified as being significant in some way; for example, having changed from a reference image. Those blocks satisfying the criterion are flagged. Unflagged blocks are then investigated using a testing protocol to determine if their contents should also be considered significant. If an unflagged block meets the test criteria, its status is changed from unflagged to flagged. The newly flagged blocks are combined with the originally flagged blocks to identify the entire set of macro blocks which is significant. Using this method, a tradeoff is made by which the original criterion is made less robust while relying on the method to identify additional macro blocks which would have been identified using a more robust procedure. Since the method operates on macro blocks and not their contents, significant savings in image processing are achieved. For example, if each macro block is a 16 by 16 pixel matrix containing two bytes per pixel for a color image, then the operations are performed on data which is 4096 times smaller than the original. While not all orphan blocks are identified using this method, the method does identify most single unflagged blocks, and multiple orphans.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 1 represents a series of macro blocks comprising an image frame after an initial processing of the frame;

FIG. 2 is the same series of macro blocks after a horizontal pass has been made through the macro blocks in accordance with the method of the present invention;

FIG. 3 is the same series of macro blocks after a vertical pass has now been made through the macro blocks;

FIG. 4 is the series of macro blocks with newly identified orphan blocks marked;

FIGS. 9 and 10 illustrate block diagrams that show the process of the present invention.

Corresponding reference characters indicate corresponding parts throughout the several views of the drawings.

DETAILED DESCRIPTION OF INVENTION

Figure 5A:
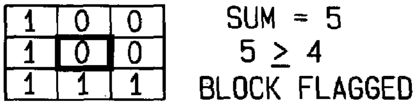
FIGS. 5A and 5B illustrate one approach to identifying orphan blocks within the matrix.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring to the drawings, FIG. 1 represents a frame of digitized image information in which the information is arranged in a matrix. Each location within the matrix comprises a macro block of information. For a matrix of a conventional size (480 pixels by 512 pixels, for example), each macro block may be 16 pixels by 16 pixels in size. Accordingly, the frame would be 30 by 32 macro blocks in size, or comprised of 960 macro blocks. The method or process by which an analog video signal or other source is converted into a digital format, and the process by which the digital information is then formed into the respective macro blocks form no part of the invention.

As noted in the Background portion of the specification, various schemes for processing the information contained in the macro blocks use a predefined set of criteria to determine if a macro block is significant. The contents of a significant macro block may be marked for transmission across a communications channel, stored, or used in subsequent processing 10. As shown in FIG. 1, those macro blocks meeting the threshold are assigned a value of 1; while those blocks which do not are assigned a value of 0.

Figure 5B:
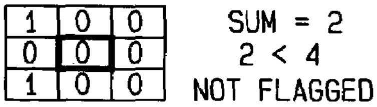

To now identify orphan blocks which should also be "flagged" for the reasons previously described, a number of approaches could be used. In one approach, for example, and as shown in FIGS. 5A and 5B, a block assigned a 0 value is identified. The values of the eight blocks surrounding this block are then summed. If the result is at least ½ the number of the surrounding blocks (i.e., 4) or greater (see FIG. 5A), then the center block is flagged. Otherwise, as shown in FIG. 5B, it is not. If the block is flagged, its assigned value, based upon the threshold testing, is still 0. Each unflagged block must be examined in this manner using the original set of values, without modification. Thus, the results are stored in a separate matrix so to not influence decisions on subsequent macro blocks which are examined. If this is not done, then the region of macro blocks changed from flagged to unflagged may grow in an undesirable fashion. The processing identified is not an undue burden on the processor as the original 512 by 480 pixel matrix of two-byte color information has been reduced to a 32 by 30 set of binary values—4096 times less data.

Figure 10:
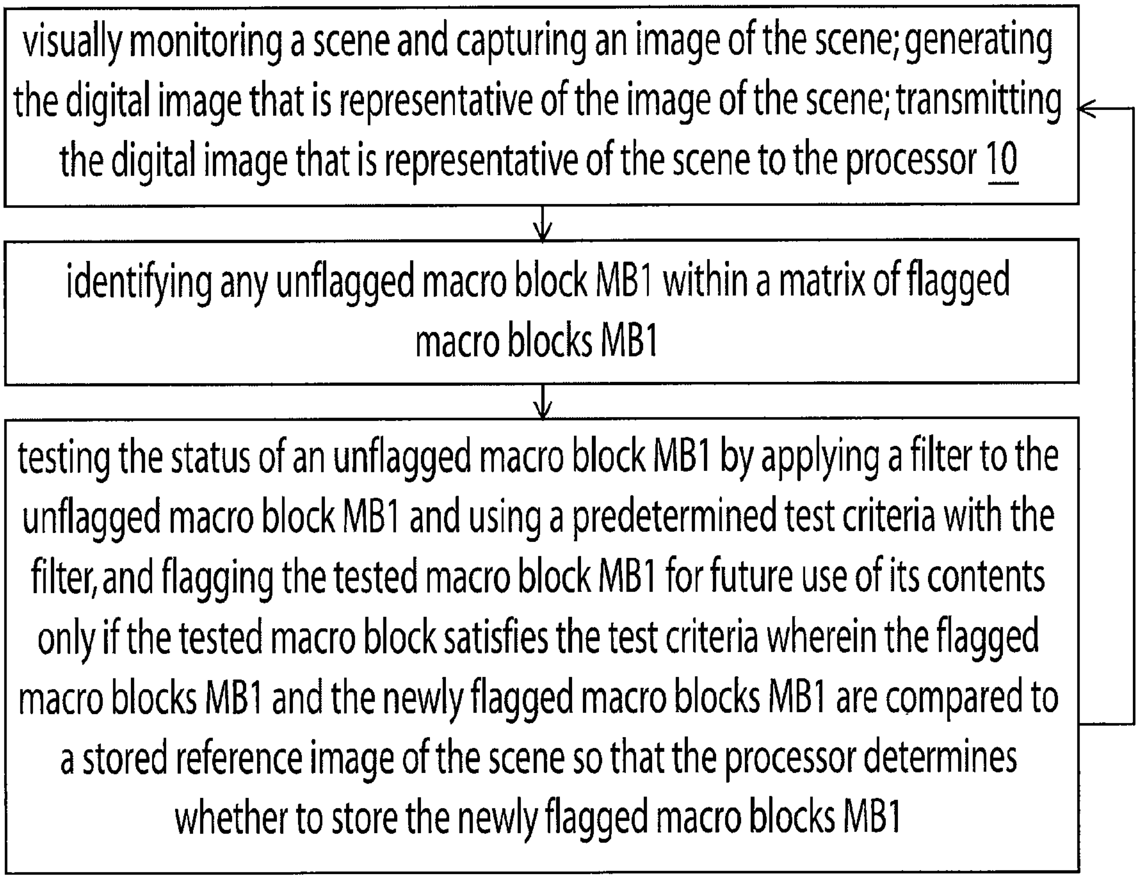

Turning to FIGS. 9 and 10 and referring to FIGS. 1–8, various methods may be used to perform the processing. For example, only macro blocks which i) have an assigned value of 0, and ii) which are adjacent a flagged block are candidate orphan blocks. Thus the processing may be limited only to those blocks. This eliminates a substantial amount of subsequent processing since, in the example of FIG. 1, a large number of blocks can now be ignored. However, this method still adds the processing steps necessary to identify candidate macro blocks. The method will be fast whenever there is a small number of 0 blocks, but may be time consuming when there is a large number of such blocks. A preferred method, as illustrated herein and described hereinafter, is to process the entire map of macro blocks using a filtering technique. This method has the advantage of simplicity and also reduces the number of computations required when there is a large number of candidate macro blocks. Thus, in accordance with the present invention, rather than performing the sum around each 0 macro block, as required with the method of FIGS. 5A and 5B, a comparable result is obtained much more quickly and with fewer computations.

The first step in the method is to identify those macro blocks which are flagged as a result of the initial comparison. In FIG. 1, these are the blocks which have a value of "1". It will be noted that this value is an arbitrary value. Those blocks whose contents are not identified as significant are now assigned a second, and different arbitrary value. In this example, that value is "0".

Figure 6A:
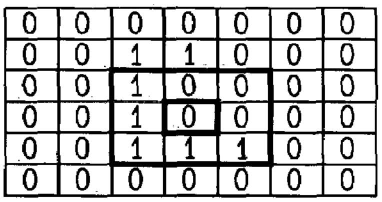
FIGS. 6A–6G illustrate how the contents of a filter matrix are combined to determine if the status of an orphan should be changed from unflagged to flagged; and, FIGS. 7 and 8 respectively illustrate use of the method for macro blocks located at an edge (FIG. 7) or corner (FIG. 8) of a frame being processed.

The next step of the method of the present invention is to process each macro block using a filter of the size n*n. Here, as shown in FIG. 1, a macro block MB1 is identified as a block to be investigated. In accordance with the investigation, a 3*3 filter F is applied to a frame with the macro block MB1 under investigation being in the center of the filter matrix. For convenience, the relevant portion of the frame of FIG. 1 is reproduced in FIG. 6A. FIG. 6A illustrates the macro block MB1 under investigation, the 3*3 filter F matrix including this block, and the macro blocks immediately adjacent the boundaries of the filter. All of the initial macro block values are the arbitrarily assigned values resulting from the initial processing of the video data comprising the frame.

Figure 6B:
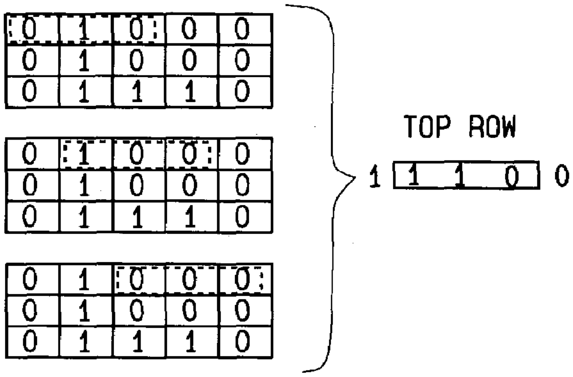
Figure 6C:
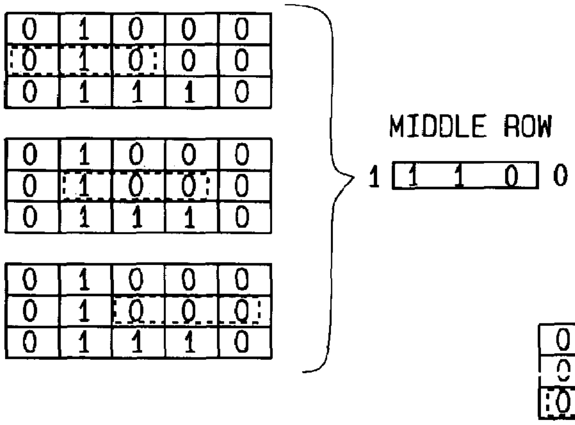
Figure 6D:
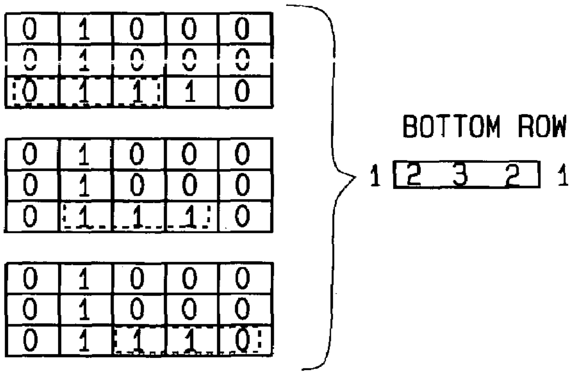

Referring to FIGS. 6B–6D, the assigned values of each macro block comprising the matrix are combined with the assigned values of the macro blocks adjacent each side of the block, and the resulting value is stored in that macro block location. In the method of the present invention, the step of combining the values first includes adding together the assigned values of the macro blocks in the rows of blocks, or horizontally. FIG. 6B illustrates operation of the method with respect to the upper row of the matrix, FIG. 6C the middle row, and FIG. 6D the bottom row. In each of the figures, the three blocks within the dashed box are the blocks whose contents are being summed. The results of the operation of this method step are indicated in FIG. 2. It will be appreciated by those skilled in the art that the values of the macro blocks surrounding the blocks within the matrix may also be changed as a result of the step, and these values are also shown in FIG. 2.

Figure 6E:
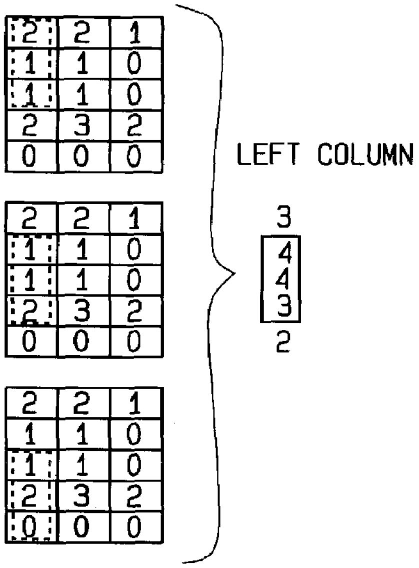
Figure 6F:
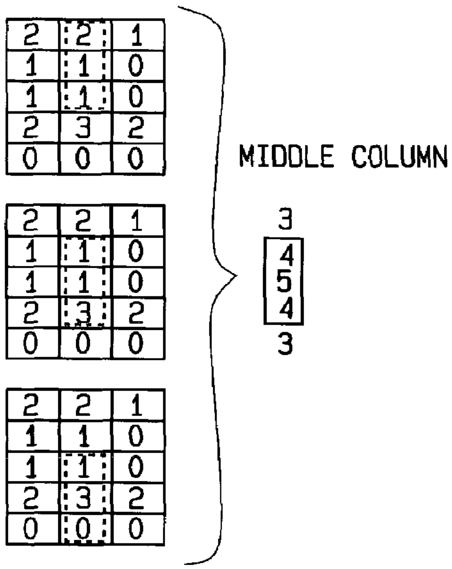
Figure 6G:
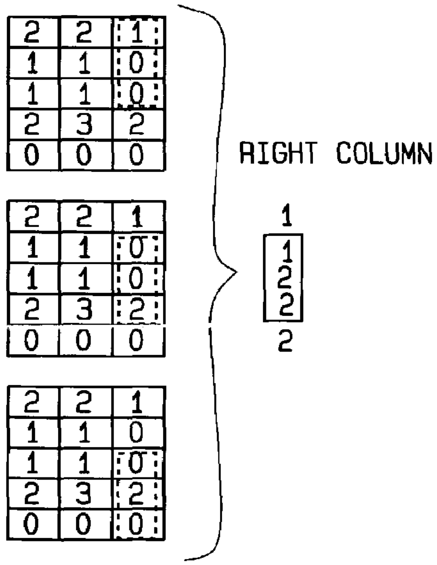

Next, the new values in the macro blocks are again combined. Now, the step of combining the values first includes adding together the assigned values of the macro blocks in the columns of blocks, or vertically. FIG. 6E illustrates operation of the method with respect to the left column of the matrix, FIG. 6F the middle column, and FIG. 6G the right column. In each of the figures, the three blocks within the dashed box are the blocks whose contents are being summed. The results of the operation of this method step are indicated in FIG. 3. Again, it will be appreciated by those skilled in the art that the values of the macro blocks surrounding the blocks within the matrix may also be changed as a result of this step, and these values are also shown in FIG. 3.

After the horizontal and vertical passes have been completed, with the resulting combined values entered into the respective macro block locations, the value now in the orphan block location is compared against an integer value equal to at least one-half the number of macro blocks surrounding the orphan block. In the current example, this number of surrounding macro blocks is eight (8), and one-half that number is four (4). In FIG. 3, the final value in the orphan block location is 5. Since 5 is at least equal to 4, the status of the orphan block is changed from unflagged to flagged. This is as shown in FIG. 4. FIG. 4 indicates which macro blocks have had their status changed from unflagged to flagged. These are the highlighted blocks. It will be noted that the value now entered in each of these macro block locations is the arbitrary value “1”, not the value resulting from the horizontal and vertical passes through the filter.

To summarize the method of the invention, as described above, first a horizontal pass was made through the entire frame, then a vertical pass. Those skilled in the art will appreciate that other methods of applying the 3×3 filter may also be employed without departing from the scope of the invention. For example, the columns may be summed first, then the rows. Transform methods may be applied, as well as other filtering techniques. Also, in using other techniques, the macro block map may not have to be maintained, nor the relative positioning of the macro blocks. The actual technique employed in practicing the invention is not as important as identifying significant macro blocks. Ideally, these macro blocks should have been identified as significant during initial processing so that no orphan blocks were left to be identified as a result of the comparison of significant macro blocks as described above.

The threshold value used to change the status of the macro block (i.e., to “flag” the block) is selected as needs dictate. For example, a lower threshold would be used to obtain a clearer image, with greater data storage required; while less storage is required if a higher threshold is used, but with a greater chance of image artifacts.

Finally, regardless of the size of the filter applied, it is necessary to take into account those macro blocks located along the sides and at the corners of the frame. In FIG. 1, these are the macro blocks MB2 and MB3 respectively. Now, in accordance with the invention, the status of the orphan block is changed from unflagged to flagged if the resulting value stored in the location of the orphan block is an integer value that is at least one-half of the number of macro blocks surrounding the orphan block.

Figure 7:
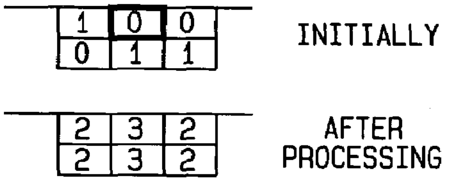

Referring to FIG. 7, the highlighted macro block MB2 is the orphan block under investigation. Because the block is located along an edge of the frame, the 3*3 filter previously discussed cannot be used. Again, after the horizontal and vertical passes have been completed, the resulting combined values are entered into the respective macro block locations. The value now entered into the orphan block location is compared against a value which is an integer equal to at least one-half the number of macro blocks surrounding the orphan block under consideration. Since there are now only five such macro blocks, the status of the orphan block is changed from unflagged to flagged if the value in the orphan block is at least 3. Since the value of the orphan block is 3, the status of the orphan block is changed from unflagged to flagged. Again, this status change is shown in FIG. 4.

Figure 8:
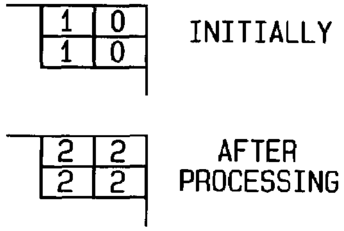

In FIG. 8, the highlighted macro block MB3 is the orphan block under investigation. Since macro block MB3 is located at a corner of the frame, the 3*3 filter again cannot be used. After the horizontal and vertical passes described above have been completed, the resulting combined values are entered into the respective macro block locations. As with macro block MB2, the value now in the orphan block location is compared against an integer value equal to less than one-half the number of macro blocks surrounding the orphan block. Since there are now only three of these macro blocks, the status of the orphan block is changed from unflagged to flagged if the value in the orphan block exceeds 1. Since the value of the orphan block is 2, and 2>1, the status of the orphan block is changed from unflagged to flagged. This status change is also shown in FIG. 4.

For simplification, the special thresholds for edges and corners may not be applied. Instead, the threshold 3 may be applied over all the macro blocks. This will result in less fidelity of the image at the edges and corners, but this method has the advantage of fewer processing steps.

Finally, in FIG. 4, all of the macro blocks whose status is changed from unflagged to flagged are indicated. As shown therein, five blocks including the macro blocks MB1–MB3 have had their arbitrarily assigned values changed from “0” to “1”. The contents of these macro blocks, in addition to those whose assigned value was already “1” will now be identified as significant. The contents of those macro blocks whose contents are “0” will be discarded.

In the preferred embodiment, in order to simplify processing, the steps as described are applied to all macro blocks and not just the unflagged macro blocks. All the macro blocks in the resulting matrix are then compared to the thresholds as described above. The result is a matrix with a new set of flagged macro blocks, the important feature being that orphan blocks not previously identified as significant are now marked as significant in the new matrix. The new matrix is then combined with the original matrix in a logical OR manner to obtain the final set of flagged macro blocks. This last step is performed so isolated flagged macro blocks in the original matrix will still show as flagged in the new matrix. In some instances it may be desirable to not include those original isolated flagged macro blocks. In that case, the logical OR of the original and new sets of flagged macro blocks is unnecessary.

Those skilled in the art will understand that the method of the invention may include finding unflagged macro blocks in a matrix where there is not a significant number of macro blocks which exceed the threshold, not changing the status of the macro blocks which exceed the threshold to flagged; while changing the status of all the remaining unflagged macro blocks status to flagged. This is, in effect, the reverse of the above described process.

Another modification to the above method would be to perform the process multiple successive times from 2 to N where N is any desired number. This would result in additional unflagged macro blocks whose status may be changed from unflagged to flagged. However, this will tend to grow the regions of flagged macro blocks and may result in unnecessarily flagged macro blocks. A decision to perform multiple operations is based upon a tradeoff between the desired result, the processing time, and the resulting increase in flagged macro blocks.

Yet another modification to the method of the preferred embodiment is to extend the image by one pixel in both the horizontal and vertical dimensions, set the values of the new pixels to flagged or unflagged as desired for the intended image processing results, and then apply the n*n filtering operation to the interior pixels of the new matrix without regard to edges or corners.

In view of the above, it will be seen that the several objects and advantages of the present invention have been achieved and other advantageous results have been obtained.

The invention claimed is:

1. A method of using a processor of a video image detection system to process the contents of a digital image comprising:

visually monitoring a scene and capturing an image of the scene;

generating the digital image that is representative of the image of the scene;

transmitting the digital image to the processor;

formatting the digital contents of the image into macro blocks of digital information;

processing each macro block using a predetermined processing criteria of the processor to distinguish significant macro blocks from macro blocks not deemed significant, macro blocks identified as being significant being referred to as flagged, and those macro blocks identified as not deemed significant being referred to as unflagged;

comparing unflagged macro blocks to surrounding macro blocks; and changing the status of an unflagged macro block to flagged if an assigned value of the compared macro blocks surrounding the unflagged macro block exceeds a predetermined threshold wherein the initially flagged macro blocks and the newly flagged macro blocks are compared to a stored reference image of the scene so that the processor determines whether to store the newly flagged macro blocks for subsequent processing.

2. The method of claim 1 in which only unflagged macro blocks adjacent flagged macro blocks are examined thereby to speed up image processing.

3. The method of claim 2 in which an original matrix of flagged and unflagged macro blocks is stored in a separate data storage location of the processor from a new matrix of flagged and unflagged macro blocks resulting from the thresholding operation so to prevent region growing.

4. The method of claim 3 in which the new matrix of macro blocks whose status is changed from unflagged to flagged is combined with the original matrix of initially flagged macro blocks in a logical OR operation, said macro blocks whose status has been changed from unflagged to flagged being referred to as orphan blocks.

5. The method of claim 1 in which each flagged macro block is assigned a first arbitrary value based upon the results from processing the macro block using the predetermined processing criteria, and each unflagged macro block is assigned a second and different arbitrary value.

6. The method of claim 4 in which a filter is applied to each unflagged macro block to determine the number of adjacent flagged macro blocks.

7. The method of claim 6 in which the filter comprises an n*n matrix of macro blocks including the unflagged macro block being examined.

8. The method of claim 7 in which n is an odd number and the unflagged macro block is located in the center of the matrix.

9. The method of claim 8 in which the assigned value of each macro block forming the matrix is combined together with the assigned value of adjacent macro blocks on either side thereof with the result being stored in the location of the macro block.

10. The method of claim 9 wherein all the macro blocks, including both flagged and unflagged macro blocks, are filtered.

11. The method of claim 10 wherein initially flagged macro blocks have their status changed to unflagged if they do not exceed the threshold after filtering.

12. The method of claim 9 in which the assigned values of the macro blocks and the adjacent macro blocks are first combined in one direction (vertical or horizontal), and then combined for each macro block and the adjacent macro blocks in the other direction.

13. The method of claim 12 in which the results stored in the location of each macro block from the first combination of values are used in performing the second combination.

14. The method of claim 13 in which the status of the macro block changes from unflagged to flagged if the resulting value stored in the location of the unflagged block is greater than or equal to a predetermined value.

15. The method of claim 14 in which the predetermined value is an integer greater than or equal to an integer which is at least one-half the number of macro blocks in the matrix surrounding the orphan block.

16. The method of claim 15 in which a frame comprised of the macro blocks of video imagery is a rectangular frame and if the macro block is located at an edge or corner of the frame, the status of the unflagged block is changed from unflagged to flagged if the resulting value stored in the location of the unflagged block exceeds an integer equal to one-half the number of macro blocks surrounding the orphan block at the edge or corner of the frame.

17. The method of claim 16 in which the arbitrary value assigned to a now flagged orphan block is changed from the second arbitrary value to the first arbitrary value for further image processing.

18. The method of claim 10 wherein the original matrix of flagged macro blocks is extended by one pixel in both the horizontal and vertical dimensions;

the new pixels are set to flagged or unflagged as desired to obtain the appropriate results;

the n*n filter is applied only to the interior pixels of the new matrix without regard to edges or corners;

the threshold is applied to all pixels; and, the results for the interior pixels are placed in a another matrix of the same size as the original matrix.

19. The method of claim 18 in which the other matrix is a 3*3 matrix.

20. A digital filtering process for analyzing contents of a digital image obtained by a video image detection system into macro blocks of digital information which are then processed using a predetermined processing criteria of the processor by which a macro block is marked for future use, each such macro block being flagged, the method comprising:

visually monitoring a scene and capturing an image of the scene;

generating the digital image representative of the image of the scene;

transmitting the digital image to the processor;

identifying any unflagged macro block within a matrix of flagged macro blocks; and, testing the status of an unflagged macro block by applying a filter to the unflagged macro block and using a predetermined test criteria with the filter, and flagging the tested macro block for future use of its contents only if the tested macro block satisfies the test criteria wherein the flagged macro blocks and the newly flagged macro blocks are compared to a stored reference image of the scene so that the processor determines whether to store the newly flagged macro blocks for subsequent processsing.

21. The method of claim 20 in which the filter comprises a 3*3 matrix of macro blocks including the unflagged macro block being tested.

22. The method of claim 21 in which separate values are assigned to each flagged and unflagged macro block, the assigned values for each macro block forming the matrix being combined together with the assigned value of another macro block on either side the tested macro block with the result being stored in the location of the tested macro block.

23. The method of claim 22 in which the assigned values are first combined for each macro block using macro blocks adjacent in one direction (vertical or horizontal) thereof, and then combined for each macro block using the adjacent macro blocks in the other direction.

24. The method of claim 23 in which the results stored in the location of each macro block from the first combination of values are used in performing the second combination of values.

25. The method of claim 24 in which the status of the tested block changes from unflagged to flagged if the resulting value stored in the location of the macro block is greater than or equal to a number equal to one-half the number of macro blocks in the matrix surrounding the tested block.

26. The method of claim 25 in which the digital image comprises a rectangular frame and if the tested block is located at an edge or corner of the frame, the status of the tested block is changed from unflagged to flagged if the resulting value stored in the location of the tested block exceeds a value equal to one-half the number of macro blocks surrounding the tested block.

27. The method of claim 26 in which the arbitrary value assigned to a now flagged tested block is changed from the second arbitrary value to the first arbitrary value for further image processing.

28. The method of claim 27 wherein the tested block is noted as an orphan block.

* * * * *